No. 813,419. PATENTED FEB. 27, 1906.
C. G. HAWLEY & H. O. HOLDERNESS.
SELECTIVE SIGNALING SYSTEM.
APPLICATION FILED DEC. 15, 1903.

Witnesses:

Inventors
Charles G. Hawley.
Herbert O. Holderness.
By C. W. Hawley
Attorney

No. 813,419. PATENTED FEB. 27, 1906.
C. G. HAWLEY & H. O. HOLDERNESS.
SELECTIVE SIGNALING SYSTEM.
APPLICATION FILED DEC. 15, 1903.

No. 813,419. PATENTED FEB. 27, 1906.
C. G. HAWLEY & H. O. HOLDERNESS.
SELECTIVE SIGNALING SYSTEM.
APPLICATION FILED DEC. 15, 1903.

Witnesses:

Inventors
Charles G. Hawley
Herbert O. Holderness

UNITED STATES PATENT OFFICE.

CHARLES G. HAWLEY AND HERBERT O. HOLDERNESS, OF CHICAGO, ILLINOIS.

SELECTIVE SIGNALING SYSTEM.

No. 813,419.   Specification of Letters Patent.   Patented Feb. 27, 1906.

Application filed December 15, 1903. Serial No. 185,246.

*To all whom it may concern:*

Be it known that we, CHARLES G. HAWLEY and HERBERT O. HOLDERNESS, citizens of the United States, residing at Chicago, in the county of Cook and State of Illinois, have invented a certain new, useful, and Improved Selective Signaling System, of which the following is a specification.

Our invention relates to selective signaling apparatus, particularly intended for employment in railway-block-signal systems for the communication of intelligence or information from one block-station to another.

The invention relates particularly to improvements upon the system and apparatus that is shown and described in our pending application, Serial No. 94,482, filed February 17, 1902, entitled "Signaling system."

The object of the invention is to improve the construction and perfect the operation of the apparatus employed in the system described in aforesaid application; and to this end our invention consists in selective signaling and signal-receiving apparatus of the construction and combination of parts hereinafter described, and particularly pointed out in the claims.

The invention will be more readily understood by reference to the accompanying drawings, forming a part of this specification, and in which—

The apparatus is made up of two essential portions—a signal-sending portion and a signal-receiving portion. As shown in the drawings, we prefer to duplicate the parts upon a single board. Thus each board carries a signal-sending and signal-receiving mechanism for each of the blocks between which the board or station is located. The two sides of the board are identical, although the parts preferably occupy reverse positions. The construction and operation of the mechanisms will be well understood from a description of one side of the board. The signal-sending mechanism will be first described. This mechanism is composed of a plurality of keys and an impulse-transmitting or circuit-closing switch, to which various movements may be imparted by said keys. The signaling is done by imparting electric impulses to the signal-line, which impulses influence and effect the operation of the signal-receiving mechanism at the distant station—a mechanism that is identical with that hereinafter described. A single impulse causes a single movement of the distant receiver, while sets of two or more impulses cause greater movement thereof, the last movement in each case being the signal-display movement. On the same board with the signaling-keys we provide a signal-releasing key, which serves also in the transmission of code-signals after the manner of an ordinary telegraph code connected with a distant sounder.

The primary object of this invention is to improve upon the apparatus that is illustrated in our pending application hereinbefore referred to, which apparatus we consider more or less objectionable by reason of the employment of a plurality of electric switches, whereas we now find that a single switch may be made to serve the purpose. The specific object of this invention may therefore be said to involve the provision of a peculiar impulse-sending switch that shall have a variable throw and to which various degrees of actuation shall be imparted by different keys. These keys shall preferably have the same throw to avoid confusion in their use.

Referring to the drawings, the signal-keys 2 will be seen to comprise substantially right-angled rods each having a knob 3, which bears a suitable designating-mark. These knobs appear above the keyboard 4. The lower end of each key-rod is journaled on a rock-shaft 5, arranged in the box beneath the board 4. The rock-shaft 5 is held in bearings 6 6 and is provided with arms 7 and 8. The first carries the contact or spring arm 9, which is insulated therefrom. The second is connected to a retracting-spring 10 and to a dash-pot or speed-governor 11. The keys are arranged to move equal distances, and their motion is communicated to the rock-shaft 5 through the lost-motion arms 12, that are fastened to the rock-shaft. These arms (see Figs. 1, 3, 4, 8, and 9) overhang the key-rods 2, and different degrees of lost motion are provided for between the arms 12 and the key-rods, so that one key will pick up and move the rock-shaft immediately upon its being pulled. The next key will move idly for a short distance before it engages and moves the rock-shaft, and so on to the last key, which passes through the greater part of its throw before it communicates any motion to the rock-shaft. This last key will communicate one step or motion to the contact or spring arm 9, while the key at the opposite end of the row will communicate the maximum number of steps of motion to said contact-arm. By selecting a key and pulling same the desired sweep of the contact-arm may be secured, and when the key is released the rock-shaft and the arm will be turned back by the pull of the spring 10, moving, however, at a regular speed, because of the presence of the regulator 11. The operator has only to pull the selected key to the limit of its motion and then release it, whereupon it will fall back. He is not required to give the key different degrees of motion for different signals. The contact-bearing part of the signal-sending switch is preferably made as shown in Figs. 1, 5, 6, and 7, wherein it will be seen that an insulating-block 13 carries a plurality of regularly-spaced contacts 14, an extra contact 15, and a main circuit-establishing contact 16. 17 is an insulated stop for the contact-arm 9. A suitable battery or generator is arranged on the line and is connected with the contacts 14 and 15. The contact 16 represents the ground connection. The main line is connected to the contact-arm 9. To prevent the sending of impulses during the forward stroke or sweep of the contact-arm, a contact-lifting device is arranged on the block 13. This comprises the plate 18, arranged on the insulating-posts and having its forward end 18' bent down onto spring contact with the block 13. The edge of the plate 18 is slotted, and the portions 18" thus separated have their forward ends bent inwardly, leaving quite a wide slot between them. When the contact-arm is swung forward by the motion of the rock-shaft, it will ride up on the end of the plate 18, and if its motion is limited to one step it will rest on the first section 18" of the plate 18. If its motion is equal to a great number of steps, it will rest on another of the parts 18" and will be permitted to pass through the slot and drop upon the block 13. It will therefore sweep back over the contacts 14 and the contact 15 and in doing so cause electric connections that result in one or more electric impulses upon the line, according to the number of contacts engaged by the contact-arm 9. Near the end of its return stroke the contact-arm passes beneath the downwardly-turned end of the plate 18 and is thus made ready for another movement. 19, 20, and 21 are binding-posts provided on the block and respectively represent the contacts 14, the contact 15, and the contact 16. The electric connections between the contacts 14, 15, and 16, the battery, ground, and the line will be understood upon reference to Fig. 14, which will be referred to in detail. The remaining members of the keyboard represent the signal-releasing and code signaling devices. Such remaining parts comprise the telegraph-key 22, the cut-out switch 23, and the contact or contacts 24, preferably arranged on the under side of the desk-top 4. The contact device 24 comprises a metal strip 24', that may be fixed on the top 4, and a movable strip or series of contacts 24", adapted to be forced against 24' by either one of the signal-sending keys 2 when raised. The contact device 24, the key 22, and the cut-out 23 are connected in the release-circuit, which is preferably separate from the signal-circuit. The telegraph-key 22 is provided with an extra contact that is joined to the contact-strip 24. The key itself is connected with ground, and the usual contact of the telegraph-key is connected to the release-line. The release-line derives its energy from any suitable source, such as a battery arranged therein. The cut-out switch 23 is included in that branch of the release-circuit which includes the release-magnet of the signal-box belonging to the bank of keys, and the cut-out is operated by the retirement of the contact-arm 9 through the operation of either one of the signal-keys to prevent the operation of the signal-magnet referred to when a releasing impulse is sent through the telegraph-key or the contact device 24. The cut-out is restored to its closed position by the return of the arm 9, an insulated pin 23' thereon at that time engaging the spring-contact of the cut-out.

Figure 11:
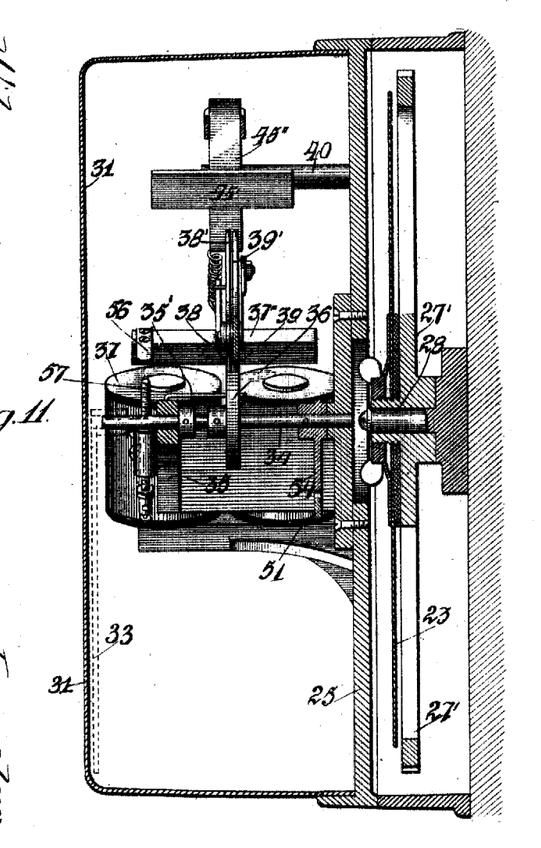
Fig. 11 is a sectional view thereof on the irregular section-line 11 V of Fig. 10.
Figure 12:
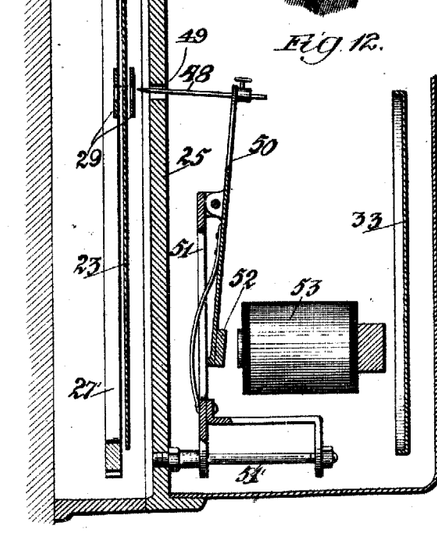
Fig. 12 is a detail section on the line 12 W of Fig. 10.

The operation and effect of the signal-keys will be explained later; but the construction thereof being now understood reference will be made to the signal-receiving portion of the apparatus. The operating parts of the signal-receiving mechanism are arranged upon a swinging door 25 of the clock-frame 26, which contains a clock 27. The frame 26 is provided with a central opening for the registering-disk 28, which is preferably arranged on a large gear-wheel that is connected to the minute-hand of the clock by a train of gears within the frame 26. The dial 28 is preferably a circular sheet of paper having marked upon it a large number of lines, which represent hours and minutes and which also has a plurality of circles dividing it into annular spaces to receive punch-marks, as hereinafter described. The sheet runs between the slotted paper-holding fingers 29, extending from the side of the opening and through which the perforating-punch works. (See Fig. 12.) The paper disk is centered by a central stud of the large gear-wheel and is held thereon by a suitable clamp 28'. (See Fig. 11.) The door 25 normally covers the registering-disk and is secured by a pin 30 on the clock-frame 26. The door carries a cover or casing 31, that is provided with an opening 32, at which the various signals are exposed. The chief moving member of the signal device comprises a signal-dial 33, which may be a complete dial or a segment of a dial, upon the face of which the various signals are printed—such, for instance, as "Repeat signal," "Is line blocked," "Train going east," "Line clear," "Train going west," "Side-track eastbound," and "Call east"—these being the set signals or phrases that are necessary for proper communication between two railway-block signal stations despatching and controlling the movements of trains. Other signal words or phrases may be used, and the number thereof may be greater, if desired. The dial works close to the front wall of the casing or hood 31 and is alone visible through the same. The dial is secured upon the horizontal shaft 34, arranged in suitable bearings in the bracket 35, attached to the door 25. The dial 33 has a step-by-step motion that is communicated to it by an electromagnetic ratchet mechanism that is actuated by impulses produced by the operation of the signal-keys at a distant station. The ratchet mechanism comprises a ratchet-wheel 36 on the shaft 34 and an electromagnet 37, the armature of which carries a pawl 38, that engages the ratchet 36. 39 is a stop-pawl for the ratchet and prevents the backward turning thereof after a forward step has been communicated to the wheel 36 and the dial by an operation of the magnet-armature. The magnet 37 is supported on the door 25, and the lever 37', carrying the armature 37'', is arranged on a post 40, extending from said door. 41 and 42 represent the leads of the signal-circuit, which are connected with the signal-magnet 37. When the magnet 37 is energized, it drives down the armature 37'' against the tension of a light returning-spring 43, moving the armature between the limits imposed by the stop 44 and the part 35' on the bracket 35, which serves as a stop for the operating-pawl 38. The duration of the impulse that energizes the magnet is very short, and the armature 37'' with the pawl 38 will therefore be quickly returned ready for a further movement by a second actuating impulse. At each movement of the armature the ratchet-wheel 36 and the dial will be moved one step—that is, the dial will expose first one signal and then another in the order of their arrangement on the dial. The impulses follow one another rapidly, and the signal phrase that will be finally displayed in the opening of the box or casing will correspond to the number of impulses in the set or series produced upon the signal-line at the distant station. After a signal has been exposed and it is desired to show another the dial must first be returned and allowed to drop to its normal or blank position. For doing this there is a release-magnet 45, (arranged on the door 25,) the armature 45' of which is arranged on a lever 45'', that is long enough to engage the tails 38' 39' of both the pawls 38 and 39. When the magnet 45 is energized, the lever will strike the pawls from the ratchet-wheel 36. This release-magnet 45 is actuated whenever the telegraph-key 22 at the distant station is operated and may therefore be used as a sounder for communicating signals in the Morse code. The release-magnet will also be actuated every time one of the signal-keys of the distant station is raised into contact with the contact-strip or device 24 belonging thereto. It will be seen, therefore, that the home dial will be released automatically each time the distant operator prepares to send a signal and before the home signal-magnet 37 can be energized to move the home dial. It being granted that all these mechanisms are duplicated at a distant station, the correspondence that may be carried on between stations will be understood.

Figure 1:
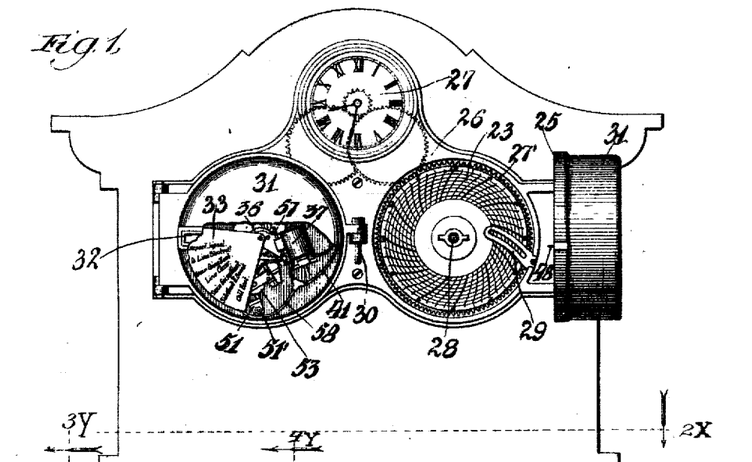
Figure 1 is a front view of our apparatus complete for a signal-station.
Figure 2:
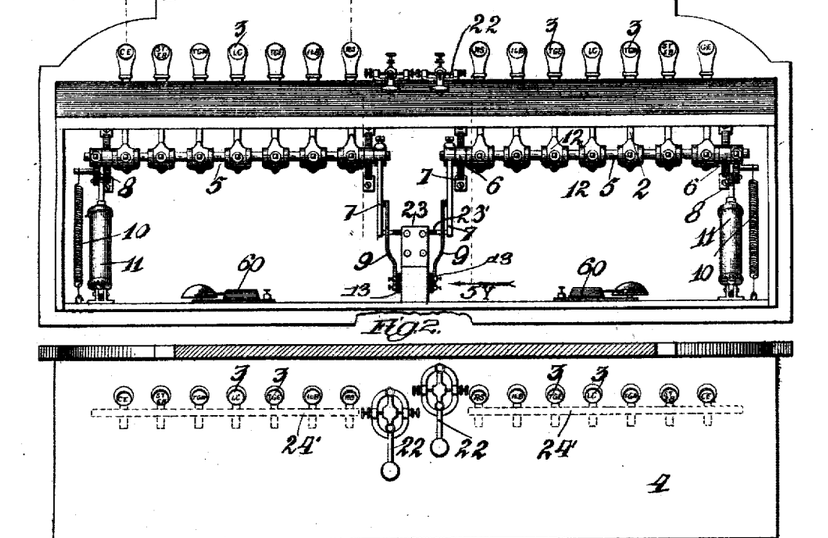
Fig. 2 is a plan view of the keyboard on the section-line 2 X.
Figure 3:
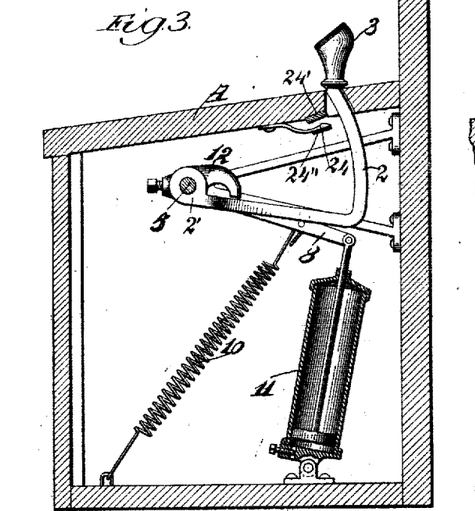
Fig. 3 is an enlarged section substantially on the line 3 Y of Fig. 1.
Figure 4:
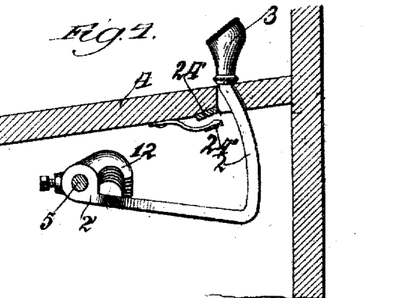
Fig. 4 is a similar section on the line 4 Y of Fig. 1.
Figure 5:
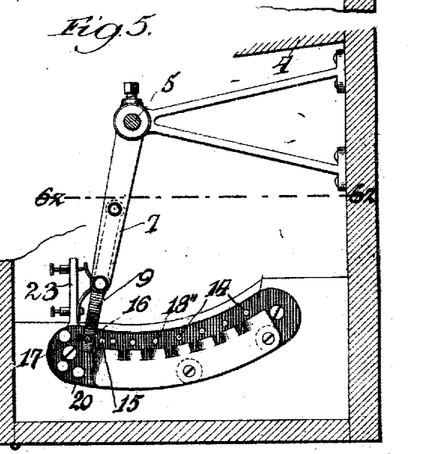
Fig. 5 is a vertical section on the line 5 Y of Fig. 1.
Figure 6:
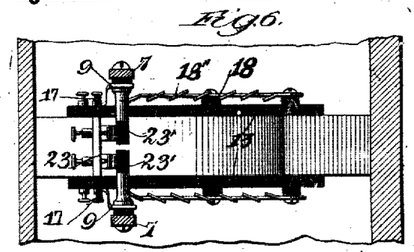
Fig. 6 is a plan view substantially on the line 6 Z of Fig. 5.
Figures 7, 8, 9:
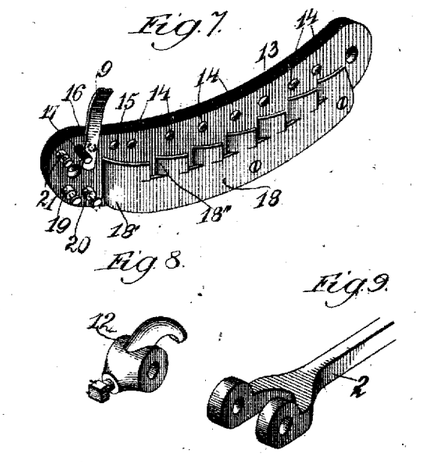
Fig. 7 is a perspective view of the selective contact device.
Figs. 8 and 9 are perspective views of parts shown in Figs. 1, 3, and 4.
Figure 10:
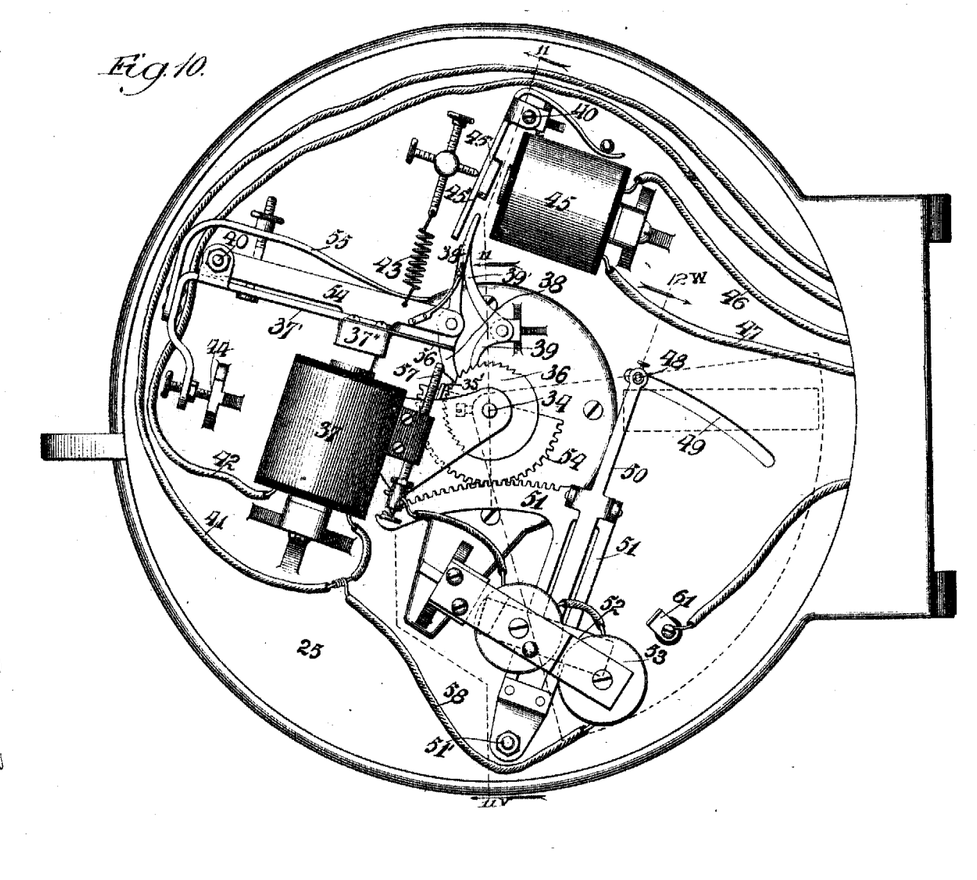
Fig. 10 is an enlarged face view of one of the signal-boxes with its cover removed.
Figure 13:
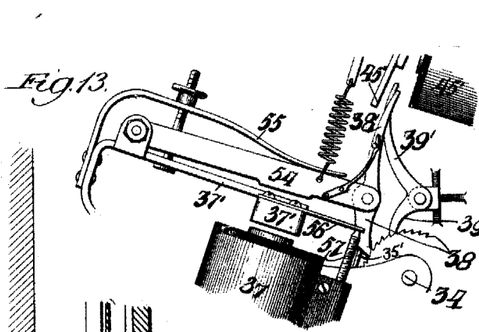
Fig. 13 is a detail of the signal-magnet and its pawl, taken from Fig. 10, but showing the parts in the position of closing the circuit of the registering device.

Our apparatus has a further function—to wit, that of recording each signal as it is received. This function is accomplished through the employment of a punch or marking device that operates upon the paper registering-dial 28 after each complete set of operations of the signal-magnet 37. This punch may be worked from the same source of energy as the magnet 37—that is, from the distant station—and is so arranged that it cannot make a mark upon the registering-disk until the signal-magnet has completed its set of operations corresponding to the signal intended to be shown on the face of the box. The punch device is of preferably simple construction, comprising a punch or marker 48, which operates through the slot 49 in the door 25 and through the slots of the paper-holding fingers 29, before referred to. The punch is held in a lever 50, that is pivoted on a swinging sector 51. The lever has an armature 52 and is operated by an electromagnet 53, fastened to the door 25. The part 51 is preferably a gear-sector that meshes with a gear 54 on the shaft 34, so that the swinging movement of the punch 48 is always proportional to the movement of the ratchet 36 and the dial 33. In other words, the position of the punch in the slot 49 will exactly correspond to the particular signal shown in the opening of the signal-box 31. 51 is journaled on a stud or post 51', and the armature 52 of lever 50 swings slightly with respect to the magnet 53, which is fixed on the door; but the disalinement of the armature does not materially affect the force of the magnet thereon. The armature and punch-lever will be moved each time that the magnet 53 is energized and at each such movement will drive the punch against or through the paper registering-disk. In this manner a mark is made upon the paper in the annular space, which corresponds to the signal exposed in the box and between the radial lines which mark the minute and hour of its exposure or receipt. The manner in which the punch is made to operate after the signal mechanism has completed its set of movements is well illustrated in Figs. 10 and 13, taken in connection with Fig. 7, showing the extra contact 15. This contact represents a battery or source of energy which is added to the source represented by the contacts 14 when the contact-arm 9 on returning bridges the last contact 14 and the contact 15 thus sending a heavier impulse over the signal-line. This final impulse serves not only to depress the armature of the signal-magnet and move the dial 33 the final step, but also serves to move the armature 37" a greater distance than do the minor impulses represented by the contacts 14, and this greater movement of the armature is employed for throwing the registering-magnet 53 into circuit for the actuation of the punch. The pawl 38, whose downward movement is limited by the upper edge of the bracket 35, is not carried directly upon the armature-lever 37", but is pivoted upon an auxiliary lever or arm 54. The part 54 may be pivoted on the post 40, and the levers 37' and 54 are normally held tightly together by a spring 55, that is carried by the former. This spring is sufficiently strong to resist the armature pull when the magnet 37 is energized by the weak impulses transmitted from the contacts 14 at the distant station; but when a stronger current is thrown upon the signal-line, through the medium of the heavy battery contact 15 at such station, the pull of the magnet 37 will exceed the strength of the spring 55, and the part 54 being blocked by the engagement of the pawl 38 with the bracket 35' the armature-lever 37' will be drawn away from it. 56 and 57 represent contact-points upon the armature-lever 37' and the bracket 35, respectively. The extra movement of the armature-lever closes the contact 56 upon the contact 57. The contacts are in circuit with the registering-magnet 53. Hence when the circuit is closed through said contacts the magnet 53 will be energized and operate the punch. We prefer that the magnet 53 shall derive its current from the signal-circuit, and therefore connect one of its leads 58 to the lead 41 of the magnet 37, while the other lead of 53 is connected to the contact-point 57. By means of this mechanism a record is made of each signal received, giving its kind and the time of its receipt. The registering papers or disks are changed every twelve hours and are kept for reference. It will be noted that the signal which either operator sends is recorded at the station of the other operator. The "call-signal" is preferably made the last upon the dial, and because of this arrangement the outermost position of the punch will represent a call. This being the case, it is a simple matter to provide an alarm-bell in proximity to the apparatus (see 60, Fig. 1) and make the circuit thereof to be closed by the swinging punch device when the latter reaches its final or outermost position. 61 represents an insulated contact on the door 25 in circuit with the bell. This is engaged by and stops the sector 51 when it reaches the call position, thereby closing the bell-circuit through the door as a ground connection.

Figure 14:
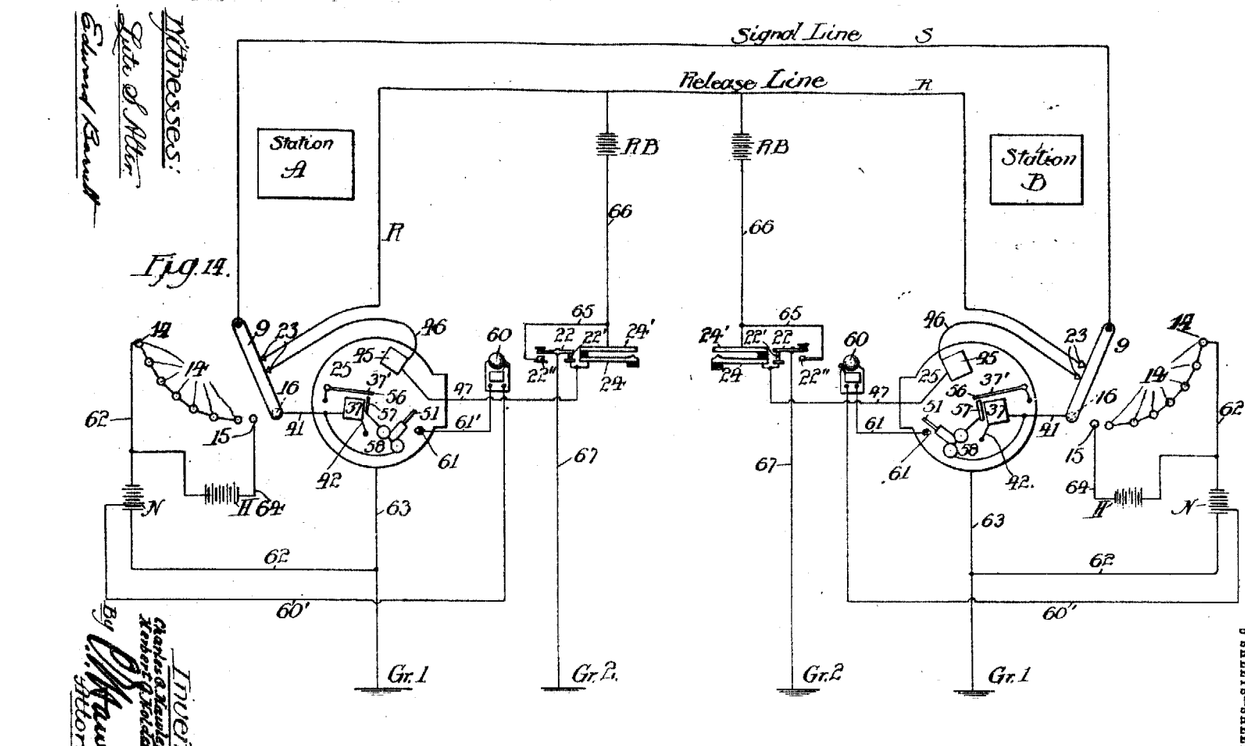
Fig. 14 is a diagrammatic view of the electric circuits of the apparatus.

The electrical features and the operation of the apparatus will be well understood from Fig. 14 of the drawings, same being a diagram of the parts and their circuits. Two stations are illustrated, station A and station B. These are supposed to be several miles distant from one another. S represents the signaling line or circuit, and R the release line or circuit. The signal-line S connects the contact-arms 9 of the two stations. Its ends are therethrough normally connected to ground, and the line is normally free from current. The release-line R connects the two release-magnets 45 of the stations, being carried through the cut-out 23 in each instance. The ends of this line are normally grounded, and the line is normally free from current. If desired, an opposite condition may be maintained—that is, current may be maintained on both lines—in which case the electromagnets will operate upon the breaking of the circuits. The open-circuit plan is illustrated because it lends itself most readily to an explanation of the working of the apparatus. The contact-arms 9, it will be observed, normally rest upon the contacts 16 of their respective switch-blocks 13, and the lead 41 of the magnet 37 is in each case connected to the contact 16, while the opposite lead of said magnet is connected to ground. In the diagram the ground connection is shown to be through the metal door 25 and the ground-line 63 leading therefrom to Gr. 1. The lead 58 of the magnet 53 is connected to 41, and on the opposite side the magnet is connected to ground through contacts 57 56, lever 37', and the metal plate 25. N is the normal or weak signaling-battery included in line 62, connected with all of the contacts 14 and which leads to the ground connection 63 or to ground direct. It will be noted that the battery-line 62 is normally open at the contacts 14. H is the extra or heavy battery arranged in the line 64, extending between the contact 15 and a point on line 62 between battery N and contacts 14. 61' and 60' are the leads or connections of the alarm-bell 60, the first being connected to the insulated contact 61, while the other is connected to one of the cells of the battery. The circuit of the bell may be traced from contact 61, through the bell to line 60', to battery N, to line 62, and through line 63 to the plate 25 and the swinging sector 51, belonging to the punch and which at certain times engages the contact 61. The sector 51 is normally out of engagement with said contact. The normal grounded connection of line R through magnet 45 has been explained. The connection between the normally open contact 22'' of the telegraph-key and the contact-strip 24, wherewith it is connected to the line R, includes the lines 65 and 66, the latter including the releasing-battery R B and being connected to the line R at an intermediate point. The ground connections with the magnets 37 and 45 are normally closed. Therefore the magnets at one station are always prepared to receive impulses from the other. Thus when it is desired to signal station B from station A the contact-arm 9 will be thrown the distance determined by the key which is selected, (usually the "call-key" to begin with.) The movement of the arm 9 immediately breaks the connection between the signal-line S and the magnet-lead 41 because the arm leaves the contact 16. It also breaks the connection between the line R and magnet 45 by opening the contacts of the circuit-breaker 23, and before the contact-arm may settle upon a contact 14 it will have closed the strip 24 against the strip 24', thus closing the circuit of battery R B through 67, key 22, 24, 24', 66, R, circuit-breaker 23 at station B, magnet 45 at said station, to the ground connection through 47, 22', 23, and 67, to Gr. 2 at station B. The magnet 45 at station B will then be energized and will operate the pawls of the dial belonging thereto to release said dial. Immediately after the release of the dial the arm 9 at station A will begin to travel over the contacts 14, and at each contact an impulse will be sent from Gr. 1 at station A through 63, 62, battery N, contact 14, arm 9, line S to arm 9 of station B, whence the circuit will be traced through contact 16, lead 41, magnet 37 to Gr. 1, through 63. Magnet 37 will thus be energized during the passage of 9 (A) over each contact 14, causing one or more step movements of the dial at station B. As the arm 9 (A) is leaving the last contact 14 it will engage the contact 15, whereupon the heavy battery will be thrown upon the line 62. The transmission of the current from H being simply added to that from N may be traced in the same manner. Its momentary introduction upon the line S will cause the necessary additional movement of the armature-lever 37' at station B to close the shunt-circuit on 41 through punch-magnet 53 and contacts 57 and 56 to ground through plate 25 and ground connections 63. Upon leaving the contact 15 the arm 9 at station A will regain its connection with contact 16, and it will be prepared to transmit the return-signal to the signal-magnet 37 at station A. Meantime the circuit-breaker 23 will have been closed by the return of arm 9 (A) and the release-line will be closed to ground through magnet 45 at A. The operation of the magnets 45 and 37 at A from the keys at B is identical with that above described, and it is only necessary to add that when it is desired to transmit a Morse-code signal from one station to the other the telegraph-key 22 is used. When this key is pressed down, the connection with the magnet 45 on the same board will be broken at contact 22', so that the home dial will not be released. The distant release-magnet, however, will be actuated from battery R B through the closing of its circuit, at such moment traced as follows: beginning at Gr. 2, station A, through 67, to telegraph-key 22, thence to contact 22'', lines 65 and 66, through battery R B to main release-line R, thence through circuit-breaker 23 at station B, and thence through release-magnet 45 at station B to line 47, contact 22', key 22, and line 67 to Gr. 2 at station B.

The registering dial and disk may, if desired, be employed for recording the operations of the semaphores whose working is controlled by our apparatus, in which case we prefer to use a second punch mechanism.

We prefer to provide full-throw devices in connection with the pull-keys at each station to compel the operator to throw them the full distance at each operation.

As other uses and various modifications of our invention will readily suggest themselves to one skilled in the art, we do not confine the invention to the specific construction herein shown and described.

Having thus described our invention, we claim as new and desire to secure by Letters Patent—

1. In an electric signaling system, a signal-circuit and a release-circuit, in combination with signaling and releasing devices arranged in pairs at distant points or stations on said circuits, means for actuating the signaling and releasing devices of each station from the other station, and means at each station preventing the operation of its signaling and releasing means during the actuation of the corresponding device at the other station, substantially as described.

2. In an electric signaling system, a signal-circuit and a release-circuit, in combination with electric signal-display means and signal-releasing means at distant stations and connected respectively with said signal and release circuits, suitable impulse-transmitting means upon each of said circuits at each station, and means preventing the actuation of the release impulse means at one station from the other, during the transmission of impulses from the latter to the first station, substantially as described.

3. In an electric signaling system, a signaling-circuit connecting distant stations, in combination with electromagnetic signal-display means at each station, a suitable switch at each station normally connecting the signaling means thereof in circuit, a suitable source of electricity at each station and normally disconnected from said circuit, and a plurality of electric contacts connected with each source of electric energy, for engagement by the respective switch during the disconnection of the latter from its respective signal-display means, substantially as described.

4. A signal apparatus, comprising electromagnetic signal-display means, in combination with an electric switch comprising a plurality of contacts and a movable member, an electric circuit normally including said movable member and said signal-display means, and a suitable source of electricity connected with said contacts, and means for imparting different degrees of movement to said movable member, for the transmission of electric impulses to said circuit, substantially as described.

5. In an electric signaling system, a signaling-circuit and a releasing-circuit, connecting distant stations, in combination with electromagnetic signal-display means at said stations, an electric switch at each station having a movable member normally completing the circuit of the respective signal-display means, electromagnetic signal-releasing means at each station, the movable switch member of each station normally completing the circuit of the respective release means, suitable sources of energy in said circuits, means for causing electric impulses upon said releasing-circuit, and a plurality of contacts provided in connection with each of said movable members, for coöperation therewith, to send impulses upon said signaling-circuit, substantially as described.

6. In an electric signaling system, signal and release circuits connecting distant stations, in combination with electromagnetic signal-display means normally connected with said signal-circuit at each station, signal-releasing means normally connected with said release-circuit at each station, an electric signaling-switch at each station, for transmitting impulses to the signal means at the other station, and means at each station whereby, by the actuation of the signaling means, the releasing means of the other station will be actuated in advance of the signal-display means at the latter station, substantially as described.

7. In a signaling apparatus, a suitable electric circuit containing pairs of signal-display and signal-releasing devices, in combination with a selective signaling switch or contact device for each said pair, energized branches of the circuit including said switches, a plurality of keys at each station, for operating its selective signaling-switch, and a release-circuit closer at each station, operable by any of the keys thereof, substantially as described.

8. In a signaling apparatus, an electromagnetic signal-display device, in combination with a selective impulse-switch or contact device in circuit therewith but distant therefrom, signal-releasing means, a signal-releasing key in circuit therewith but distant therefrom, a plurality of signaling-keys provided in connection with said selective signaling device, and means connected with said releasing-key for automatically releasing the distant releasing device on the operation of any one of said signaling-keys, substantially as described.

9. In an electric signaling apparatus, a movable signal-display member, in combination with a ratchet device, a lever bearing the pawl of said ratchet device, an armature-lever yieldingly connected to the pawl thereof, means limiting the movement of the pawl-lever, a contact for engagement by the armature-lever upon its separation from the pawl-lever, and an electromagnet for actuating said levers simultaneously, substantially as described.

10. In a signaling apparatus, a movable signal-display member, in combination with an electromagnetic device for actuating the same, a signal-registering mechanism having a movable member operated by and in time with said display member, and electromagnetic means for actuating said movable member after it is positioned by said display member to register the position assumed by the display member, substantially as described.

11. In a signaling apparatus, a movable display member, in combination with an electromagnetic step-by-step mechanism for operating said member, an electromagnetic punch to be energized by an extra movement of the electromagnetic mechanism, and a registering device having a member operable by said electromagnet and to which step-by-step movement is imparted by the movement of said display member, substantially as described.

12. In a signaling apparatus, a signal-display member, in combination with electromagnetic operating means therefor, capable of a normal and an extra movement, the circuit of said electromagnetic registering means, and an electromagnetic registering means included in a branch of said circuit and operable upon the extra movement of said operating means, substantially as described.

In testimony whereof we have hereunto set our hands, this 8th day of December, A. D. 1903, in the presence of two witnesses.

CHARLES G. HAWLEY.
HERBERT O. HOLDERNESS.

Witnesses:
J. K. JOICE,
B. K. SEFTON.